United States Patent [19]
Henneberg et al.

[11] 4,286,483
[45] Sep. 1, 1981

[54] TOOL HOLDING TURRET FOR ROTATING MACHINE

[75] Inventors: Hasso Henneberg, Hanover; Werner Hesse, Wedemark; Wilhelm Junike, Hanover, all of Fed. Rep. of Germany

[73] Assignee: Gildemeister AG, Bielefeld, Fed. Rep. of Germany

[21] Appl. No.: 85,604

[22] Filed: Oct. 17, 1979

[30] Foreign Application Priority Data

Aug. 10, 1979 [EP] European Pat. Off. ............ 79102916
May 25, 1979 [DE] Fed. Rep. of Germany ....... 2921284

[51] Int. Cl.³ .............................................. B23B 29/32
[52] U.S. Cl. .................................... 82/2 R; 82/36 A; 29/27 R; 29/39; 74/817
[58] Field of Search ...................... 82/2 R, 2 B, 36 A; 29/27, 39; 74/816, 817

[56] References Cited

U.S. PATENT DOCUMENTS 3,798,721  3/1974  Schalles ............................... 82/36 A
3,874,257  4/1975  Hikota et al. ............................ 29/27
4,058,034  11/1977  Lahm et al. ........................... 82/36 A

FOREIGN PATENT DOCUMENTS 111224  6/1900  Fed. Rep. of Germany .............. 29/39
877161  9/1942  France ......................................... 29/39

Primary Examiner—Leondias Vlachos
Attorney, Agent, or Firm—Owen, Wickersham & Erickson

[57] ABSTRACT

The invention comprises a tool turret for a turning machine whose operational axis has a wider spacing from the bed of the carriage than the spindle axis of the turning machine. The tool turret has an inner rim with inner turning tools and an outer rim with outer turning tools, the inner and outer turning tools being angularly offset in relation to each other. In order to bring the inner and outer turning tools into operating position during the stepwise further movement of the turret, successive operational angles must be variable. Because of the wider spacing of the operational axis from the bed of the carriage, the turret disc carrying the tools can be made larger with the result that more tools can be provided thereon or the spacing between the tools can be enlarged. The changeover with unequal angles can be accomplished by means of a regulated direct current motor, the operational angle being fed into the regulation circuit as the desired value.

12 Claims, 2 Drawing Figures

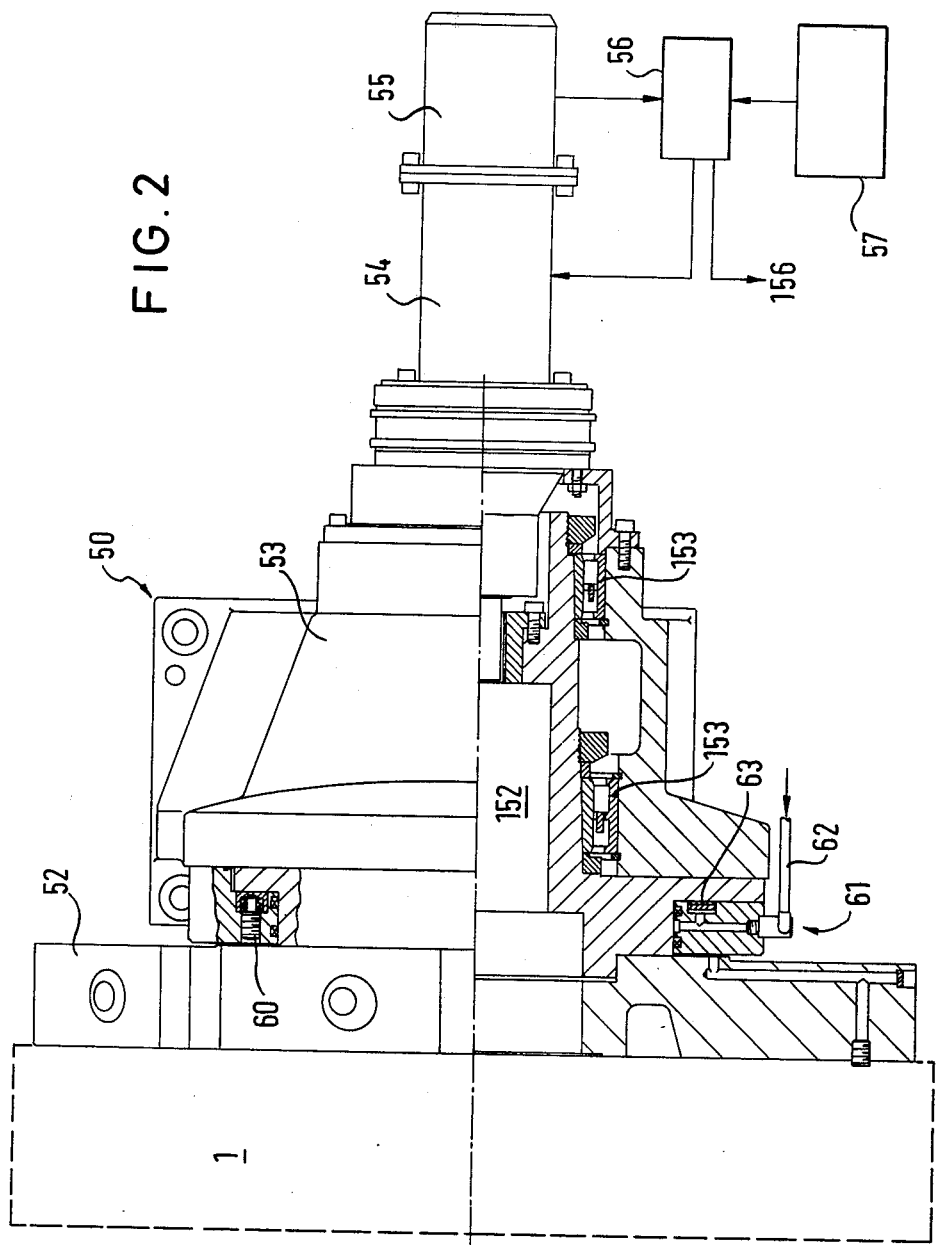

TOOL HOLDING TURRET FOR ROTATING MACHINE

BACKGROUND OF THE INVENTION

This invention relates to an improved tool turret for turning machines.

Turretheads are known in the state of the art for receiving a number of tools, such as chisels, for outside turning tools and drill rods for inside work, the tools being mounted on a capstan which in turn is disposed, movably in two directions, on an inclined bed carrier.

The mountings for the tools provided on the turret are conventionally distributed, for example, in two concentric semicircles, so that the carriers of one semicircle are disposed on the angle bisector between the carriers of the other semicircle, thus resulting in a symmetrical distribution of all carriers. As a rule, the height or the distance of the axis of rotation of the turning machine and thereby of the workpiece above the inclined bed carrier is preset. In accordance with the state of the art, this also determines the maximal spacing of the control axis of the turret above the inclined bed carrier, that is, the maximal diameter of the tool-carrying plate of the turret, so that the fixed tools can be displaced or brought forward when the turret and its carriers move on the inclined bed carrier up to the middle of the workpiece.

Maximal limitation of the diameter of the tool-carrying plate also represents a limitation for the maximum number of possible tool carriers, particularly for drill bits, on the turret. If the individual tool carriers of the turret are too close together, the space required for working with a tool clamped in a carrier is inadmissibly curtailed.

It is therefore an object of the present invention to provide a turret which is improved over the state of the art in that, at a given spacing of the spindle axis of the turning machine from its carriage, it offers a larger number of tool carriers and/or a wider space for the workpiece.

Another more specific object of the invention is to provide a turret for retaining processing tools on a turning machine which is disposed on a cross-slide rest that is displaceable vertically to the spindle axis of the turning machine on a turning carriage and wherein the operational axis of the turret is located at a greater distance from the carriage than the spindle axis and the turret is shiftable at unequal angles.

SUMMARY OF THE INVENTION

Briefly stated, the principle of the turret according to the present invention is that, compared with the spacing of the spindle axis of the turning machine from the inclined bedplate or carriage, a wider spacing is provided for the control axis of the turret from the carriage. Thus, tools which are mounted in two semicircles on the turret in which the bores of the tool holders are equidistantly distributed, are caused to move forward at unequal angles. Preferably, the tool carriers or tool centers which are distributed equidistantly on one semicircle, are disposed at an angle different from the angle bisector of the corresponding equidistantly distributed tool carriers or holders of the other semicircle. The turret is arrested in the momentary angular position by frictional, particularly hydraulic, clamping.

Further description of the invention and its embodiments will follow in connection with the drawings, in which;

BRIEF DESCRIPTION OF THE DRAWING

FIG. 2 is a side view, partially in section, of the holder for the novel turret mounted in the turret carrier.

DETAILED DESCRIPTION OF EMBODIMENT

Figure 1:
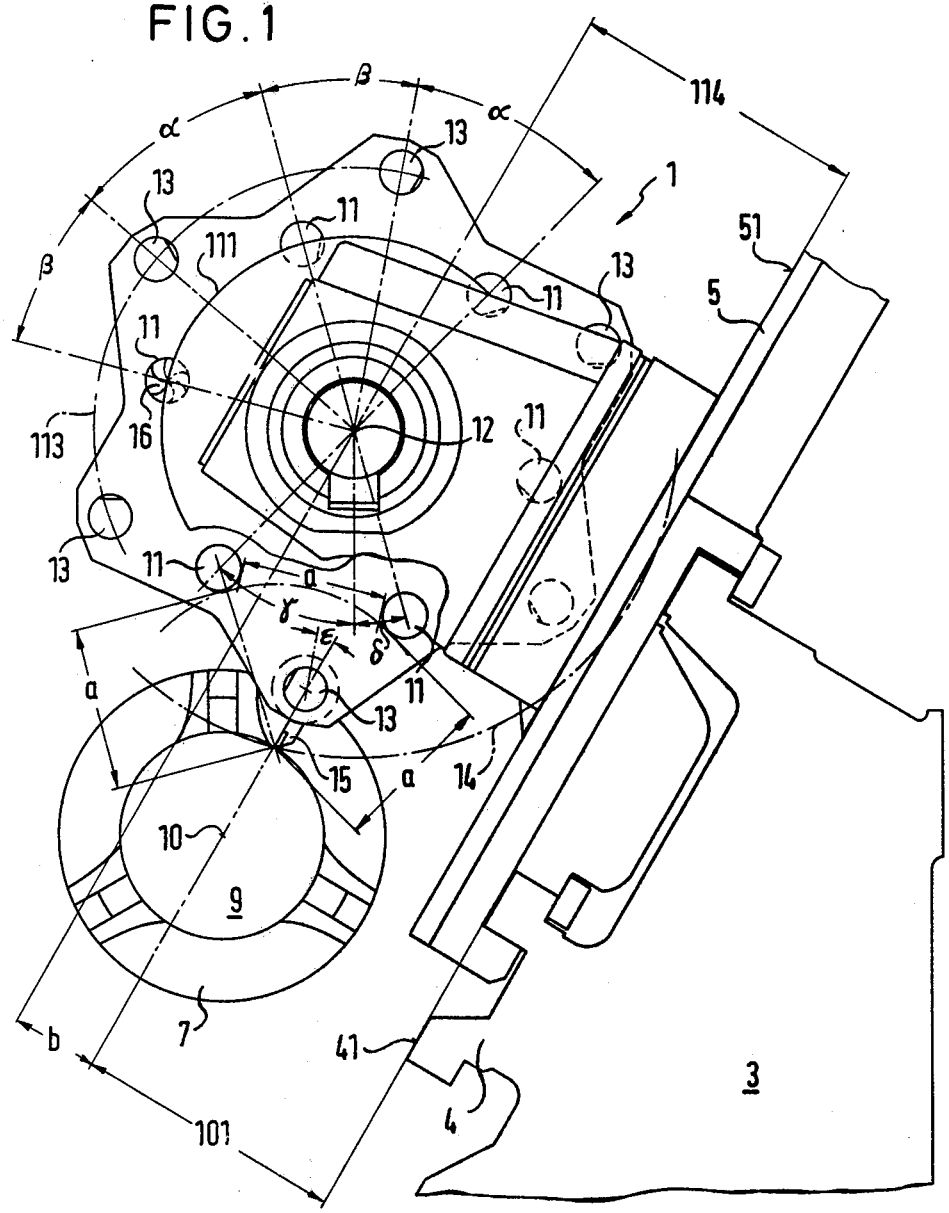
FIG. 1 is a side view of the turret in accordance with the invention, mounted on the illustrated part of the turning machine and the inclined bed carriage in its position in relation to the chuck of the turning machine.

With reference to the drawing, FIG. 1 shows a front view of the turret 1 in accordance with the invention, in its position as a tool carrier in relation to the bed carriage 5, which is disposed obliquely in the turning machine 3, and to the workpiece 9 clamped in the chuck 7 of the turning machine, and with the bores 11 and 13 for the carriers and the tools, the bores being distributed in accordance with a preferred embodiment of the invention. The bed carriage 5 is, in a known manner, slidingly movable horizontally on the inclined track 4 of the portion of the turning machine 3 shown in FIG. 1. The direction of such movement is thus vertical to the presentation plane of FIG. 1.

Numeral 10 designates the spindle axis (vertical to the presentation plate of FIG. 1) of the turning machine 1 or of the clamped workpiece 9 which is to be processed. The control axis of the turning machine (also vertical to the presentation plane of FIG. 1) is designated with the numeral 12.

In the known prior art turning machines of appropriate type, the spindle axis 10 of the turning machine and the control axis 12 of the turret are disposed in a plane parallel to the inclined carriage 4 or the bed carriage 5, so that the spacing 101 of the spindle axis 10 and the spacing of the control axis 12 from the surface 51 of the bed carriage 5 are of the same size. Thus, with these known constructions, outside processing tools clamped in the mountings of the turret can be brought up to the workpiece and to the spindle axis 10 when the turret is moved in parallel, namely, so that the tip of, for example, the turning tool 15 which is moved in the parallel plane of the inclined carrier track 4 is guided from the circumference up to the middle of the workpiece 9 parallel to the inclined carriage. However, this principle results in that, in the case of the known turret turning machines wherein the spacing 101 of the spindle axis 10 of the workpiece from the surface 41 of the inclined plate 4 is a preset magnitude, the maximal radius of the flying circle 14 of the point of a clamped tool 15 is limited, namely, that this radius of the flying circle diameter cannot be larger than this spacing. This, however, is different in the case of the present invention which will be described in further detail below.

In accordance with the principle of the invention, as shown in FIG. 1, and in contrast to the above described state of the art, the diameter of the turret 1 or the radius of the flying circle 14, can be considerably larger than the (preset) spacing 101 between the spindle axis 10 and the surface 41. That is, in accordance with the invention, the control axis 12 of the turret 1 lies in a plane above the surface 41 of the inclined track 4, and spacing 114 from the surface 41 to the control axis is wider by the magnitude b than the spacing 101. If the tool 15 which is clamped in the mounting of the bore 13 is to be here also, as described above, conveyed in the position parallel to the bed 4 to the workpiece 9 from its circumference up to its spindle axis 10, the turning tool 15 is clamped in the turret 1 in accordance with the invention at an angle to the momentary radial direction of the turret 1. Conveyance of the tool 15 to the workpiece 9 and the treatment of the latter is then identical to the practice of the prior art.

The control axis 12 of the turret in accordance with the invention may also be almost parallel or somewhat oblique in relation to the spindle axis 10.

An additional advantage may be derived from the displacement, in accordance with the invention, shown in FIG. 1, of the control axis 12 of the turret in relation to the spindle axis 10 referred to the inclined carrier track 4 or the bed carrier 5; said advantage will be discussed in greater detail below.

The arrangement of the axis 12 of the turret 1 in accordance with the invention at a spacing 114 which is wider than the spacing 101 of the spindle axis 10 of the turning machine by the magnitude b allows the use of a turret or a tool carrier disc having a correspondingly larger diameter. In particular, this enlarged diameter offers the possibility of providing a greater number of mounts and associated bores 11 and 13 for inside and outside processing tools to be clamped into them (such as for example the illustrated turning tool 15 and the illustrated drilling rod 16) on the enlarged circumference of the turret 1.

In another feature of the turret 1 in accordance with the invention, switching of the turret is provided for with successively unequal angles $\gamma \neq \delta$. Of importance for the definition of the angles $\gamma$ and $\delta$ is the point of intersection (see FIG. 1) of the (smaller) divided circle 111 on the turret with the plane going through the spindle axis 10 and parallel to the carriage surface 51, or the point of intersection of the top edge of the turning tool 15 clamped parallel to the inclined bed with the divided circle 111. From this point of intersection, the angle $\gamma$ counts up to the one bore 11 and the angle $\delta$ up to the other bore 11 (as shown in FIG. 1).

A development of the invention is to dispose the mutually equidistant mountings of the bores 11 of the one smaller divided circle in a position—as also shown in FIG. 1—angularly twisted in relation to the mutually equidistant mountings, i.e. bores 13 of the other larger divided circle 113. The angle $\alpha$ between a bore 13 of the one divided circle 113 and the bore 11 of the other divided circle 111 adjacent to it in clockwise direction is, as may be seen, clearly larger than the angle $\beta$ between the bore 11 and the next bore 13 of the larger divided circle, also adjacent in clockwise direction. This unequal alternating angular distribution of the bores 11 and 13 of the mountings of the two divided circles 111, 113 on the turret 1, which is different from the known angle bisection, is useful for optimal exploitation of a turret disposed and constructed in accordance with the invention, namely for a maximal number of bores 11 and 13 for mountings.

With this feature of an alternatingly variable angle distribution $\alpha$ and $\beta$ between adjacent bores 11 and 13, optimal utilization of the space available on the periphery of the turret 1 for the mountings of the bores 11 and 13 is achieved for control axis 12 of the turrethead 1 which is offset by the magnitude b in relation to the spindle axis 10 of the workpiece 9. As may be seen in FIG. 1, the two bores 11 which are closest to the bore 13, with the turning tool 15 clamped into the bore 13, have a substantially wide spacing a from the tip, that is the effective area, of the clamped-in tool 15 which processes the workpiece 9. The two spacings between these bores 11 adjacent the bore 13 with the turning tool 15 and the edge of the chuck 7 or the workpiece 9, measured parallel to the surface 51 of the bed carriage 5, namely, in the direction of displacement of the turret on the carriage 5, are with this unequal angle division $\alpha$ and $\beta$ at least substantially equal in size, as they would be in the case of a control axis which is not offset by the magnitude b and where the division is exactly angle-bisecting. In the case of the present invention, despite this advantageous offset of the axis 12 by the magnitude b, the same large free space is restored between the chuck 7 and the mountings of the bores 11 which are adjacent the mounting that momentarily is in operational position.

In accordance with a further development, the spacing of two adjacent bores 11 of the smaller divided circle 11 also has the magnitude a, so that the tip of the tool 15 and the adjacent bores 11 form an equilateral triangle.

Such unequal angle division $\alpha \neq \beta$ allows the provision of a number of mountings of the bores 11, 13 on the turret 1, such as may be mounted on a conventional turret with an equally large flying-circle diameter, but which could be used only in a turning machine with comparatively larger spacing of the spindle axis from the inclined carriage, that is, only in a larger machine.

A turret with the features in accordance with the invention is also advantageous in cases where, while no larger number of mountings on the turret is required, yet a larger free space is demanded between the chuck 7 of the turning machine and the adjacent mountings, for example, for processing a workpiece having a larger diameter. In this event, an unchanged number of bores 11, 13 of the mountings can be distributed on a turret larger by the magnitude b corresponding to the offset of the control axis in accordance with the invention, the bores being distributed with correspondingly wider spacings on the two divided circles 111 and 113.

In contrast to a conventional turret with an angle remaining the same from mounting to mounting, it is necessary in the case of a turret with alternatingly variable angles $\alpha$ and $\beta$, to provide alternatingly variable operating angles $\alpha$ and $\beta$. As will be seen in FIG. 1, the equation $\alpha + \beta = \gamma + \delta$ applies. However, the distribution of the sum of the angles $\alpha + \beta$ between the angles $\gamma$ and $\delta$ is slightly different therefrom.

FIG. 2 shows, in a side view, in a direction rotated by 90° in relation to FIG. 1, the carrier 50 for the turret disc 1 (exchangeably) secured thereto and shown merely schematically in outline. In addition to the base plate 52 which must be suitably rotated gradually during stepping up of the turret disc 1, the carrier 50 in accordance with FIG. 2, which is mounted on the inclined carrier displaceably in a plane parallel thereto, comprises the stationary bearing box 53, the drive motor 54 secured thereto, and the angle-imparting means 55. Associated therewith is a regulator 56 to which the desired value for the further operational step of the turret is fed by a setting means 57.

Ball and roller bearings 153 are provided for supporting the shaft 152 of the base plate 52 in the bearing box 53.

The motor 54 for driving the base plate 52 is preferably a direct current servomotor which is coupled with the shaft 152 with a gear having little play and friction. The angle means 55 is an incremental measuring system which may also be integrated in the motor 54. This measuring system has a high resolution and thereby permits control of the smallest angle increments. Greatest accuracy of the angle adjustment of the turret or of the tools in relation to the workpiece is thereby achieved. A mechanically operating brake 60 in a single or multiple arrangement is provided on the periphery with which a constant frictional braking is obtained between the base plate 52, which is to be turned, and a spring-loaded friction plate held in the stationary bearing box 53 and lying against the base plate. With this brake, rotational moments of inertia are in particular braked which would result in the required angle adjustment position being overrun.

Arresting of the angular adjustment of the base plate 52 and thereby of the turret disc 1 in relation to the bearing box 53 and thereby in relation to the turning machine is accomplished with the aid of a hydraulic device 61. During adjustment or rotatation of the base plate 52 the hydraulic device 61 is out of operation. However, at the moment of the desired stoppage, pressure is supplied to the piston cylinder unit 63 through the pipe conduit 62, the pressure urging a piston against one of the parts, so that the bearing box 53 and the base plate 52 are practically held secure against rotation in relation to each other. The bearing box 53 and the base plate 52 are thus clamped together hydraulically and can be released from each other again.

Apart from the fact that with this type of stoppage of the base plate 52 and thereby of the turret disc 1, the advantage is created that any desired angles of adjustment of the turret head in relation to the workpiece may be laid down and kept arrested, this type of stoppage, together with the displacement of the operational axis by the magnitude b also has the advantage, which has already been indicated above, that in the event of an excessive force acting on the outside treatment tool, for example on the turning tool 15, the tool and the turret disc can give way. Since the stoppage with the hydraulic device 61 is merely frictional and that the frictional connection can be adjustable by the selection of the hydraulic pressure (and of the constructional size of the device 61), the dimensions may be chosen so that in regular operation it produces sufficient stoppage, but in the event of an overload, the above mentioned deviation can take place. This offers an important protective function against overload which allows for example a relatively lighter construction.

The turret 1 can be driven by the motor 54 in both rotational directions, so that the tool required at a given time can be brought into operational position over the shortest path.

The above mentioned setting means 57 delivers the control values to the regulator 56 which, together with the incremental measuring system, takes care that the motor 54 actually reaches the correct angular position for the turret 1 that is required at the given time. Corrections of the position of the tool are accomplished via the control. The latter may have a fixed standard graduation which is stored in the form of parameters. If the required angular position is not reached or cannot be maintained, for example, because the force acting on the tool and the torque thereby occurring in relation to the axis 12 is too great or has become too great, a signal 156 is given via the regulator 56 to switch off the turning machine.

With a turret drive as here provided, turrets with quite different divisions which can be attuned optimally to the given workpiece spectrum may be exchangeably used.

The above embodiment of the invention has been described in connection with a turning machine with an oblique bed carriage. As may be seen, the invention may also be used for turning machine with differently supported turrets, that is, turrets movable in another plane.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A turret for processing tools on a turning machine, which is disposed on a cross-slide rest displaceable vertically to a spindle axis of the turning machine on a turning carriage, the latter in turn being displaceable parallel to said spindle axis, comprising: a first set of inner turning tools forming processing tools disposed at equidistant spacings on a circle around an operational axis of the turret, extending parallel or substantially parallel to the spindle axis; a second set of processing tools, at least one of which is an outer turning tool, disposed with their cutting tips outside the circle of said first set so that a tool of one set is always disposed between two tools of the other set, the distances of the cutting tip of one outer turning tool and the two adjacent inner turning tools of the first set being equal or substantially equal to the distance of the tips of the two adjacent inner turning tools, the cutting tip of the tool which at a given time is in its operational position being in a plane extending substantially parallel to the bed of said carriage; means for supporting said turret so that its said operational axis is at a greater distance from said carriage than said spindle axis; and means on said turret for shifting it about its operational axis at unequal angles.

2. The turret in accordance with claim 1, including a first series of bores on the circle of said turret, for receiving mounting supports for the processing tools of said first set; a second set of bores disposed with equidistant spacing on a further circle concentrically surrounding said other circle, wherein the two bores of said second set adjacent each bore on the other circle have different angular spacing as compared with the first-mentioned bore.

3. The turret in accordance with claim 1, which the distances from the tip of a clamped outer tool on the one hand to the two bores of the inner divided circle of the mounting supports of the inner tools on the other hand are equal.

4. The turret in accordance with claim 3, wherein the distance between two adjacent bores of the inner divided circle of the mounting supports of the inner tools is equal to the distances between the tip and bores of the inner circle.

5. The turret in accordance with claim 1, including a controllable drive motor and an angle control means connected thereto for providing its operational movement.

6. The turret in accordance with claim 5, wherein said drive motor is a direct-current motor.

7. The turret in accordance with claim 1, wherein a frictional connection means for rotatory coupling is provided between said turret and its said turret carriage.

8. The turret in accordance with claim 7, wherein said frictional connection is a hydraulic means with which the turret and the turret carriage are controllably coupled so as to resist torsion.

9. The turret in accordance with claim 8, wherein said frictional connection is a friction clutch adjusted for permanent sliding.

10. The turret in accordance with claim 1, including a setting means for storing the momentary operational angle of said turret (1) for numerical control.

11. The turret in accordance with claim 10, wherein said operational angle is variable by means for receiving an input of correction values.

12. The turret in accordance with any of claim 1, including a regulator means with a signal output for arresting the turning machine when the desired value of angle adjustment of said turret cannot be adhered to.

* * * * *